United States Patent
Nho et al.

(10) Patent No.: US 11,952,461 B2
(45) Date of Patent: Apr. 9, 2024

(54) SILOXY POLYETHYLENE GLYCOL AND DERIVATIVES THEREOF

(71) Applicant: SunBio, Inc., Gunpo-si (KR)

(72) Inventors: Kwang Nho, Anyang-si (KR); Minjung Ahn, Yongin-si (KR); Changmin Hyun, Anyang-si (KR); Junghoon Lee, Goyang-si (KR)

(73) Assignee: SUNBIO, INC., Gyeonggi-Do (KR)

( * ) Notice: Subject to any disclaimer, the term of this patent is extended or adjusted under 35 U.S.C. 154(b) by 263 days.

(21) Appl. No.: 17/208,057

(22) Filed: Mar. 22, 2021

(65) Prior Publication Data

US 2022/0298302 A1    Sep. 22, 2022

(51) Int. Cl.
| | |
|---|---|
| *C08G 65/26* | (2006.01) |
| *C08G 65/332* | (2006.01) |
| *C08G 65/333* | (2006.01) |
| *C08G 65/334* | (2006.01) |

(52) U.S. Cl.
CPC ..... *C08G 65/2639* (2013.01); *C08G 65/2603* (2013.01); *C08G 65/3322* (2013.01); *C08G 65/3326* (2013.01); *C08G 65/3328* (2013.01); *C08G 65/33306* (2013.01); *C08G 65/33331* (2013.01); *C08G 65/3342* (2013.01)

(58) Field of Classification Search
None
See application file for complete search history.

(56) References Cited

U.S. PATENT DOCUMENTS

| | | |
|---|---|---|
| 5,013,556 A | 5/1991 | Woodle et al. |
| 5,478,806 A | 12/1995 | Nho |
| 5,985,265 A | 11/1999 | Kinstler et al. |
| 6,113,906 A | 9/2000 | Greenwald et al. |
| 6,774,180 B2 | 8/2004 | Kozlowski et al. |
| 6,828,401 B2 | 12/2004 | Nho et al. |
| 6,956,135 B2 | 10/2005 | Rosen et al. |
| 7,041,855 B2 | 5/2006 | Rosen et al. |
| 7,781,563 B2 | 8/2010 | Park et al. |
| 8,804,170 B2 | 8/2014 | Takata et al. |
| 8,936,942 B2 | 1/2015 | Heyes et al. |
| 10,561,732 B2 | 2/2020 | Heyes et al. |
| 10,882,954 B2 | 1/2021 | Nho et al. |

FOREIGN PATENT DOCUMENTS

| | | | |
|---|---|---|---|
| JP | 2004010841 A | * | 1/2004 |
| WO | 2016205384 A1 | | 12/2016 |

* cited by examiner

*Primary Examiner* — Tae H Yoon
(74) *Attorney, Agent, or Firm* — Panitch Schwarze Belisario & Nadel LLP

(57) ABSTRACT

Disclosed are a novel monofunctional polyethylene glycol (PEG) and derivatives thereof. More particularly, one terminal of each of the monofunctional polyethylene glycol and derivatives thereof is modified with a siloxy group. The novel monofunctional polyethylene glycol (PEG) offers an alternative to methoxy polyethylene glycol.

10 Claims, No Drawings

SILOXY POLYETHYLENE GLYCOL AND DERIVATIVES THEREOF

BACKGROUND OF THE INVENTION

1. Field of the Invention

The present disclosure relates to monofunctional polyethylene glycol having one terminal modified with a siloxy group, and derivatives thereof.

2. Discussion of Related Art

Polyethylene glycol (PEG), having the general chemical formula of H—(OCH$_2$CH$_2$)$_n$—OH, is a polymeric substance generally regarded as being safe for human consumption, and it has found its way into a variety of consumer products such as food, cosmetics and pharmaceuticals. When applied to pharmaceuticals, PEG is often conjugated to a pharmaceutical molecule to become one entity whose outcome is an improved pharmacokinetics as manifested in prolonged in vivo retention time as well as a better toxicity profile. This practice of PEG conjugation to a target is termed PEGylation.

The technology of PEGylation has been successfully used in many pegylated biopharmaceuticals since the first pioneering work conducted by Abuchowski et al. (1977 J Biol Chem 252:3582-3586). One such example of a US FDA-approved pegylated biopharmaceutical is PEG-filgrastim which represents a treatment for neutropenia in cancer patients undergoing chemotherapy, as described in U.S. Pat. No. 5,985,265 by Kinstler et al.

For the purpose of PEGylation, methoxy PEG has been often the choice of raw material, of which one end is capped with a methoxy group (CH$_3$O—), and the other end being a hydroxyl group (—OH). The methoxy PEG may be generally depicted as,

CH$_3$O—(CH$_2$CH$_2$O)$_n$—H.

The hydroxyl end of the methoxy PEG can subsequently be derivatized through a series of organic reactions into a functional group, which may be generally depicted as,

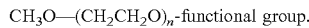

CH$_3$O—(CH$_2$CH$_2$O)$_n$-functional group.

The functional group of the PEG is designed to react readily with a target moiety, such as an amine of a protein, an amine of a lipid, a hydroxyl of a sugar, a hydroxyl of an enzyme, or any nucleophilic moiety of a compound. After the PEGylation reacts with the target, the resulting conjugates are pharmaceutically useful PEG-proteins, PEG-lipids, PEG-sugars, PEG-enzymes, and PEG-nucleic acids, etc. Particularly, PEG-lipids such as PEG-DSPE (PEG-distearoyl phosphatidylethanolamine) or PEG-DOPE (PEG-dioleyl phosphatidylethanolamine) are important components in making liposome nanoparticles. Liposome nanoparticles are widely used as drug delivery vehicles for drugs and biologicals including anticancer drugs, gene vectors and mRNA vaccines.

U.S. Pat. No. 5,013,556 discloses a liposome composition which contains between 1-20 mole percent of an amphipathic lipid derivatized with a polyalkylether, which can be exemplified by phosphatidylethanol amine derivatized with polyethyleneglycol. The derivatized lipid enchances the circulation time of the liposomes several-fold, and this enhancement is achieved through the use of either fluid or membrane-rigidifying liposome components. Also disclosed are a method for delivering a drug for that has slow release form the bloodstream, and a method for targeting a selected tissue or cells with liposomes via the bloodstream. The raw material used in this invention was methoxy PEG.

U.S. Pat. No. 5,478,806 discloses a composition of pegylated hemoglobin which is intended to oxygenate hypoxic tumor cells in order to render them more susceptible to chemotherapy or radiation therapy. The pegylated hemoglobin was pegylated with methoxy PEG succinimidyl carbonate. The raw material PEG used in this invention was methoxy PEG.

U.S. Pat. No. 5,985,265 discloses a pegylated G-CSF, which represents a treatment for neutropenia in cancer patients receiving chemotherapy. The pegylated G-CSF was pegylated with methoxy PEG aldehyde. The raw material used in this invention was methoxy PEG.

U.S. Pat. No. 6,113,906 discloses branched, non-antigenic PEGs. Conjugates prepared with the polymers and biologically active molecules such as proteins and peptides demonstrate extended circulating life in vivo. Substantially fewer sites on the biologically active material are used as attachment sites. The raw material used in this invention was methoxy PEG.

U.S. Pat. No. 6,774,180 discloses a high molecular weight derivative of activated PEG and the like polymers prepared with high purity by conjugating a large PEG molecule to a small PEG molecule. The raw material used in this invention was methoxy PEG.

U.S. Pat. No. 6,828,401 discloses a novel synthetic method for a PEG-maleimide derivative beneficial for use as a pegylation reagent in the field of bioengineering and the medicinal field based on conjugating certain moieties or specific domains of polysaccharides with biological proteins, such as antibodies, utilized as bio-compatible or bio-degradable polymers. The raw material used in this invention was methoxy PEG.

U.S. Pat. No. 6,956,135 discloses a novel monofunctional PEG aldehyde for the pegylation of therapeutically active proteins. The pegylated protein conjugate that is produced, retain a substantial portion of its therapeutic activity and is less immunogenic than the protein from which the conjugate is derived. The raw material used in this invention was methoxy PEG.

U.S. Pat. No. 7,041,855 discloses a novel monofunctional PEG aldehyde with a linker moiety between the PEG backbone and the functional aldehyde group, which is useful for the pegylation of therapeutically active proteins. The raw material used in this invention was methoxy PEG.

U.S. Pat. No. 7,781,563 discloses a method of preparation of methoxy PEG with high purity and a derivative thereof, specifically the method of preparation of high purity methoxy PEG with at least 99% purity, up to a molecular weight distribution of 1.05, and up to a molecular weight of 100,000 at a commercial scale. The PEG used in this invention was methoxy PEG.

WO2016205384A1 discloses multi-drug lipid nanoparticles that stably incorporate multiple small molecule drugs with divergent hydrophobic and water solubility characteristics and rmethods of making and utilizing the same. The disclosed compositions and methods provide for enhanced stability of lipid nanoparticle drug formulations that can reliably offer drugs addressing different mechanistic targets with prolonged presence in the body for more efficacious treatment and avoidance of resistance towards a single drug. One of the lipids used in the making of lipid nanoparticles is mPEG-DSPE (mPEG-distearoyl phosphatidylethanolamine). The PEG used in this invention was methoxy PEG.

U.S. Pat. No. 8,804,170 states that PEG is often conjugated with therapeutic proteins to enhance their PK properties. PEG may, however, be immunogenic, and the presence of PEG in food and cosmetics is believed to result in enhance the capability of pre-existing anti-PEG antibodies in humans. Polyclonal and monoclonal antibodies reactive to PEG are provided for use in immunogenicity assay development to detect such anti-drug antibodies. Such antibodies exhibit preferential binding to PEG with a molecular weight ranging from 350 daltons to 40 kDa. Anti-PEG antibodies of the invention are engineered to comprise human Fc regions to enable non-bridging immunoassay formats. The PEG mentioned in this patent is methoxy PEG.

U.S. Pat. No. 8,936,942 provides a composition comprising a polyethylene-dialkyloxypropyl conjugates (PEG-DAA), liposomes, SNALP (stabilized nucleic acid lipid particles), and SPLP (stabilized plasmid-lipid particles) comprising such a composition, and methods of using such a composition, liposomes, SNALP, and SPLP. The PEG used in the compositions is methoxy PEG.

U.S. Pat. No. 10,561,732 provides a composition and a method related to the delivery of therapeutic agents to cells. In particular, this includes novel, trialkyl, cationic lipids and nucleic acid-lipid particles that provide efficient encapsulation of nucleic acids and efficient delivery of the encapsulated nucleic acid to cells in vivo. The composition of the present invention is highly potent, thereby allowing effective knock-down of a specific target protein at relatively low doses. The PEG-lipid used in the making of lipid particles is composed of lipids that are pegylated with methoxy PEG.

U.S. Pat. No. 10,882,954 discloses a novel monofunctional PEG and derivatives thereof. More particularly, one terminal of each of the monofunctional PEGs and derivatives thereof is modified with a tertiary alkoxy group. The PEG mentioned in this patent is tertiary alkoxy PEG.

As illustrated by the prior arts, methoxy PEG has been the main raw material used in the making of monofunctional PEG derivatives, possibly due to the fact that methoxy PEG is the only mono-capped PEG raw material that has been available. The present invention offers an alternative to the use of methoxy PEG.

SUMMARY OF THE INVENTION

Therefore, the present disclosure has been made in view of the above limitations, and it is an object of the disclosure of the present invention to provide a novel monofunctional polyethylene glycol for PEGylation of proteins, peptides, enzymes, lipids, nucleotides, nucleosides, drugs, and the like, and derivatives thereof.

In accordance with the present disclosure, the aforementioned matter and other objects can be accomplished by the provision of tertiary siloxy PEG represented by Formula 1 below and derivatives thereof:

[Formula 1]

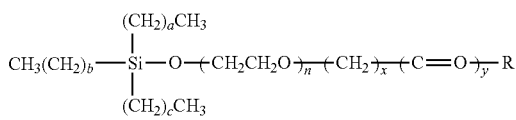

wherein a, b, and c are independently an integer of 0 to 10,
n is an integer of 2 to 10,000,
x is an integer of 0 to 5,
y is an integer of 0 or 1, and
R is selected from the group consisting of hydrogen, an amine group, a thiol group, a substituted or unsubstituted aryl, a C2-C6 alkenyl, and a C2-C20 heterocyclic group.

DETAILED DESCRIPTION

Hereinafter, the present disclosure is described in more detail.

All technical terms used in the present disclosure have meanings as commonly understood by those of ordinary skill in the relevant field of the present disclosure unless otherwise defined. In addition, exemplary methods or samples are described in this specification, but similar or equivalent ones should also be included in the scope of the present disclosure. The contents of all publications disclosed as reference documents in this specification are incorporated herein by reference to their entirety.

An aspect of the present disclosure provides tertiary siloxy PEG represented by Formula 1 below and derivatives thereof:

[Formula 1]

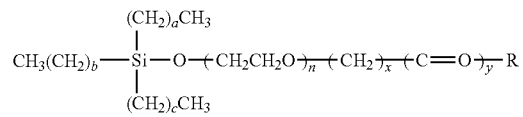

wherein a, b, and c are independently an integer of 0 to 10,
n is an integer of 2 to 10,000,
x is an integer of 0 to 5,
y is an integer of 0 or 1, and
R is selected from the group consisting of hydrogen, an amine group, a thiol group, a substituted or unsubstituted aryl, a C2-C6 alkenyl, and a C2-C20 heterocyclic group.

"Siloxy PEG" used in this specification, refers to a silicon (Si) capped monofunctional PEG with an oxygen molecule between the Si and PEG. As one of the simplest forms of a siloxy PEG, a trimethyl siloxy PEG is formed when a, b and c are 0, and a triethyl siloxy PEG is formed when a, b, and c are 1. Meanwhile, "tertiary siloxy" refers to siloxy having three alkyls surrounding Si.

The term, "aryl" refers to any functional group or substituent derived from an aromatic ring, usually an aromatic hydrocarbon, such as phenyl, and the aryl group may be substituted or unsubstituted.

As used herein, the term "alkenyl" refers to a linear or branched, unsaturated hydrocarbon chain radical which includes one or more unsaturated bonds, including for example and in a non-limiting sense, vinyl and the like.

The term, "heterocyclic group" refers to a cyclic ring that has atoms of at least two different elements as members of its ring, including for example and in a non-limiting sense, a heteroaryl, a substituted or unsubstituted cyclic imide, cyclic ether, etc.

In accordance with an embodiment of the present disclosure, a compound represented by Formula 1 is trimethyl siloxy PEG when each of a, b, and c in Formula 1 is 0, and a compound represented by Formula 1 is triethyl siloxy PEG when each of a, b, and c in Formula 1 is 1.

In accordance with an embodiment of the present disclosure, in Formula 1,
a, b, and c may be independently an integer of 0 to 10,
n may be an integer of 2 to 10,000,
x is an integer of 0 to 5
y is an integer of 0 or 1, and R is selected from the group consisting of hydrogen, an amine group, a thiol group, a substituted or unsubstituted aryl group, a substituted or unsubstituted vinyl group, a C2-C10 heteroaryl group, a C2-C10 cyclic ether, and a C2-C10 cyclic imide group.

In accordance with an embodiment of the present disclosure, in Formula 1,
  a, b, and c may be independently an integer of 0 to 10,
  n may be an integer of 2 to 10,000,
  x is an integer of 0 to 5
  y is an integer of 0 or 1, and
  R may be selected from the group consisting hydrogen, a substituted or unsubstituted vinyl group, a C2-C10 heteroaryl group, a C2-C10 cyclic imide group, a substituted or unsubstituted aryl group, and a C2-C10 alkyl-(C=O)-succinimidyl group.

In accordance with an embodiment of the present disclosure, when x is 0 in Formula 1,
  a, b, and c may be independently an integer of 0 to 10,
  n may be an integer of 2 to 10,000,
  y may be an integer of 0 or 1, and
  R may be selected from the group consisting of hydrogen, a substituted or unsubstituted vinyl group, a C2-C20 heteroaryl group, a C2-C10 cyclic imide group, a substituted or unsubstituted aryl group, and a C2-C10 alkyl-(C=O)-succinimidyl group.

Particularly, when x is 0 in Formula 1, a compound represented by Formula 1 may be any one of the following compounds: trialkyl siloxy PEG; trialkyl siloxy PEG-acrylate; trialkyl siloxy PEG-benzotriazolyl carbonate; trialkyl siloxy PEG-methacrylate; trialkyl siloxy PEG-nitrophenyl carbonate; trialkyl siloxy PEG-succinimidyl carbonate; trialkyl siloxy PEG-maleimide; trialkyl siloxy PEG-succinimidyl glutarate; and trialkyl siloxy PEG-succinimidyl succinate.

Particularly, when x is 0 and y is 0 in Formula 1, a compound represented by Formula 1 may be trialkyl siloxy PEG, trialkyl siloxy PEG-nitrophenyl carbonate, trialkyl siloxy PEG-succinimidyl carbonate, or trialkyl siloxy PEG-maleimide.

In addition, when x is 0 and y is 1 in Formula 1, a compound represented by Formula 1 may be trialkyl siloxy PEG-acrylate, trialkyl siloxy PEG-benzotriazolyl carbonate, trialkyl siloxy PEG-methacrylate, trialkyl siloxy PEG-succinimidyl glutarate, or trialkyl siloxy PEG-succinimidyl succinate.

In accordance with an embodiment of the present disclosure, when x is 1 in Formula 1,
  a, b, and c may be independently an integer of 0 to 10,
  n may be an integer of 2 to 10,000,
  y may be an integer of 0 or 1, and
  R may be a C2-C10 heterocyclic group or hydrogen.

Particularly, wherein C2-C10 heterocyclic group may be a cyclic ether or cyclic imide. In addition, more particularly, the C2-C10 heterocyclic group may be an epoxide or clyclic imde.

Particularly, when x is 1 in Formula 1, a compound represented by Formula 1 may be any one of the following compounds: trialkyl siloxy PEG-aldehyde, trialky siloxy succinimidyl carboxymethyl, and trialkyl siloxy PEG-epoxide.

Particularly, a compound represented by Formula 1 may be trialkyl siloxy PEG-epoxide when x is 1 and y is 0 in Formula 1, and a compound represented by Formula 1 may be trialkyl siloxy PEG-aldehyde or trialky siloxy succinimidyl carboxymethyl when x is 1 and y is 1.

In accordance with an embodiment of the present disclosure, when x is 2 in Formula 1,
  a, b, and c may be independently an integer of 0 to 10,
  n may be an integer of 2 to 10,000,
  y may be an integer of 0 or 1, and
  R may be an amine group, a C2-C10 cyclic imide, a thiol group, or hydrogen.

Particularly, when x is 2 in Formula 1, a compound represented by Formula 1 may be any one of the following compounds: trialkyl siloxy PEG-amine, trialkyl siloxy PEG-sulfhydryl, trialkyl siloxy PEG-propionaldehyde, and trialkyl siloxy PEG-succinimidyl propionate.

Particularly, when x is 2 and y is 0 in Formula 1, a compound represented by Formula 1 may be trialkyl siloxy PEG-amine, or trialkyl siloxy PEG-sulfhydryl.

In addition, when x is 2 and y is 1 in Formula 1, a compound represented by Formula 1 may be trialkyl siloxy PEG-propionaldehyde or trialkyl siloxy PEG-succinimidyl propionate.

In accordance with an embodiment of the present disclosure, when x is 3 in Formula 1,
  a, b, and c may be independently an integer of 0 to 10,
  n may be an integer of 2 to 10,000,
  y may be 1, and
  R may be hydrogen.

Particularly, when x is 3 in Formula 1, a compound represented by Formula 1 may be trialkyl siloxy PEG-butyraldehyde.

In the present disclosure, the trialkyl siloxy PEG represented by Formula 1 may be synthesized to have a high molecular weight by continuously reacting trialkyl silanol or trialkyl silanoic salt with ethylene oxide. Particularly, a trialkyl silanol may be reacted with ethylene oxide in the presence of potassium hydroxide, as a catalyst, to synthesize low-molecular weight trialkyl siloxy PEG as disclosed in Reaction Scheme 1-1 or 2-1 of the present disclosure. Subsequently, since the processes of Reaction Schemes 1-2, 1-3, 2-2, and 2-3 may be additionally performed to synthesize high-molecular weight trialkyl siloxy PEG, the trialkyl siloxy PEG of the present disclosure may be synthesized without limitation limitations related to molecular weight thereof.

In accordance with an embodiment of the present disclosure, the trialkyl siloxy PEG represented by Formula 1 may have a molecular weight (MW) of 100 to 500,000 Daltons (Da), preferably, a molecular weight of 400 to 100,000 Da, and more preferably, a molecular weight of 400 to 30,000 Da.

Accordingly, in Formula 1, n may be an integer of 2 to 10,000, preferably, an integer of 2 to 5,000, and more preferably, an integer of 2 to 1,000.

Hereinafter, the present disclosure will be described in more detail with reference to the following Examples. Those skilled in the art can recognize that the scope of the present disclosure is not limited to the following Examples.

Example 1: Trimethyl Siloxy PEG 5000 Synthesis

1-1. Trimethyl Siloxy PEG 400 Synthesis

Trimethyl siloxy PEG 400 was synthesized according to Reaction Scheme 1-1 below:

[Reaction Scheme 1-1]

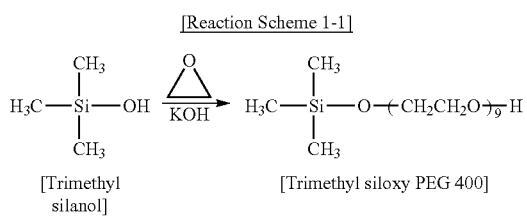

[Trimethyl silanol] → [Trimethyl siloxy PEG 400]

Trimethyl silanol is used as the starting material in this example, however, other types of starting material such as trimethyl silanoic potassium salt or trimethyl silanoic sodium salt can also be used. Particularly, a 10 L reactor was washed with deionized water and dried, and then filled with nitrogen gas. A 10 g of trimethyl silanol and 0.4 g of potassium hydroxide (KOH), as a catalyst, were introduced into the reactor. A solution in the reactor was stirred, and an internal temperature of the reactor was elevated up to 80° C. while continuously supplying nitrogen gas thereto. After the internal temperature of the reactor reached 80° C., an ethylene oxide (hereinafter referred to as "EO") gas was introduced into the reactor at a rate of 25 g/h until a final amount reached 240 g while controlling the internal pressure of the reactor. After introducing the EO gas, the internal temperature of the reactor was elevated up to 130° C., and 550 g of EO was fed thereinto. Next, the internal pressure of the reactor was maintained at 3 to 5 kg/cm² for 12 hours while maintaining the reactor temperature. Next, the temperature of the reactor was elevated to 140° C. and maintained for 1 hour, followed by cooling the reactor and removing unreacted EO. As a result, 200 g of trimethyl siloxy PEG with molecular weight of 400 Da was obtained.

1-2. Trimethyl Siloxy PEG 2000 Synthesis

Trimethyl siloxy PEG 2000 was synthesized according to Reaction Scheme 1-2 below:

[Reaction Scheme 1-2]

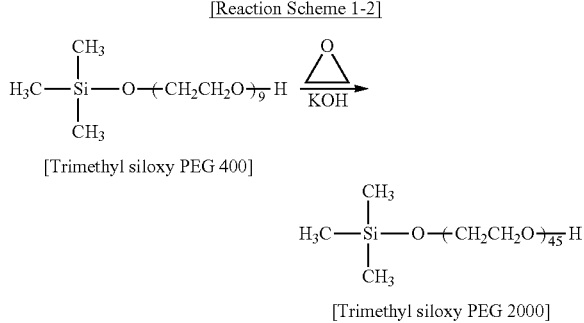

[Trimethyl siloxy PEG 400] → [Trimethyl siloxy PEG 2000]

Particularly, a 10 L reactor was washed with deionized water and dried, and then filled with nitrogen gas. An internal temperature of the reactor was set to 80° C. The 200 g of the trimethyl siloxy PEG 400 synthesized in Example 1-1 was introduced into the reactor. A solution in the reactor was stirred, and an internal temperature of the reactor was elevated up to 120° C. while continuously supplying nitrogen gas thereto. After the internal temperature of the reactor reached 120° C., EO gas was introduced into the reactor at a rate of 40 g/h until a final amount reached 650 g. After introducing the EO gas, the internal temperature of the reactor was elevated up to 130° C., and an internal pressure of the reactor was maintained at 2 to 5 kg/cm² for 12 hours while maintaining the reactor temperature. Next, the temperature of the reactor was elevated to 140° C. and maintained for 1 hour, followed by cooling the reactor and removing unreacted EO by means of a vacuum pump. As a result, trimethyl siloxy PEG with molecular weight of 2000 Da was obtained.

1-3. Trimethyl Siloxy PEG 5000 Synthesis

Trimethyl siloxy PEG 5000 was synthesized according to Reaction Scheme 1-3 below:

[Reaction Scheme 1-3]

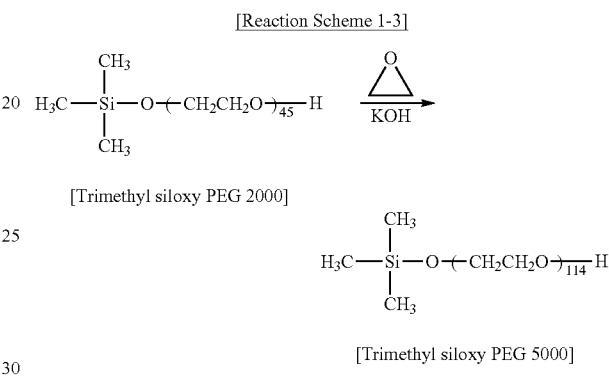

[Trimethyl siloxy PEG 2000]

[Trimethyl siloxy PEG 5000]

Particularly, a 10 L reactor was washed with deionized water and dried, and then filled with nitrogen gas. An internal temperature of the reactor was set to 80° C. The 500 g of the trimethyl siloxy PEG 2000 synthesized in Example 1-2 was introduced into the reactor. A solution in the reactor was stirred, and an internal temperature of the reactor was elevated up to 110° C. while continuously supplying nitrogen gas thereto. After the internal temperature of the reactor reached 110° C., EO gas was introduced into the reactor at a rate of 150 g/h until a final amount reached 1,000 g. After introducing the EO gas, the internal temperature of the reactor was elevated up to 135° C., and an internal pressure of the reactor was maintained at 2 to 5 kg/cm² for 12 hours while maintaining the reactor temperature. Next, the temperature of the reactor was elevated to 145° C. and maintained for 1 hour, followed by cooling the reactor until 90° C. and removing unreacted EO by means of a vacuum pump. For neutralization, 2 g of acetic acid was added to the reactor, followed by stirring for 30 minutes. As a result, trimethyl siloxy PEG with molecular weight of 5000 Da (Compound 1) was obtained.

Example 2: Trimethyl Siloxy PEG-Acrylate 5000 Synthesis

A 100 g of trimethyl siloxy PEG 5000 was dissolved in 500 ml of methylene chloride, and then 10 ml of trimethylamine was added thereto. Next, 4 ml of acryloyl chloride was added thereto dropwise at 0° C., and then a reaction was allowed to proceed by stirring at room temperature for 14 to 18 hours. Deionized water was added to the resultant mixture, and an organic layer was extracted therefrom. Methylene chloride was added to an aqueous layer thereof, and an organic layer was re-extracted. A solvent in the extracted organic layer was dried using magnesium sulfate (MgSO₄), followed by concentration and then solidification with diethylether. A solidified product was filtered and vacuum-dried at room temperature for 24 hours. As a result, trimethyl siloxy PEG-acrylate 5000 (Compound 2) was obtained.

Example 3: Trimethyl Siloxy PEG-Methacrylate 5000 Synthesis

A 100 g of trimethyl siloxy PEG 5,000 was dissolved in 500 ml of methylene chloride, and then 15 ml of trimethylamine was added thereto. Next, 8 ml of acryloyl chloride was added thereto dropwise at 0° C., and a reaction was allowed to proceed by stirring at room temperature for 15 to 20 hours. Deionized water was added to the resultant mixture to extract an organic layer. Methylene chloride was added to an aqueous layer, the organic layer was re-extracted therefrom once more. A solvent in the extracted organic layer was dried using magnesium sulfate, followed by concentration and then solidification with diethylether. A precipitated product was filtered, and vacuum drying was performed at room temperature for 24 hours. As a result, trimethyl siloxy PEG-methacrylate 5000 (Compound 3) was obtained.

Example 4: Trimethyl Siloxy PEG-Aldehyde 5000 Synthesis

A 5 ml of oxalyl chloride was added while stirring 200 ml of methylene chloride at −78° C. Next, 9 ml of dimethyl sulfoxide (DMSO) was slowly added to the mixture dropwise for 30 minutes while stirring. A 100 g of trimethyl siloxy PEG 5000, which had been previously dissolved in 200 ml of methylene chloride, was added to the resultant mixture, followed by stirring at −78° C. for 30 minutes. The temperature of the resultant mixture was warmed to room temperature, and the mixture was stirred for 10 minutes. A 40 ml of triethylamine was added to the mixture, followed by stirring at room temperature for 30 minutes. Next, deionized water was added to the resultant mixture, and 2 N hydrochloric acid (HCl) was added thereto to adjust the pH of the mixture to 2. Next, a cold aqueous sodium hydrogen carbonate (NaHCO$_3$) solution was added to the mixture to neutralize the mixture to pH 7. A product was extracted twice with methylene chloride, and then an organic layer was dried with magnesium sulfate, followed by concentration and then solidification with diethylether. A precipitated product was filtered and vacuum-dried at room temperature for 24 hours. As a result, trimethyl siloxy PEG-aldehyde 5000 (Compound 4) was obtained.

Example 5: Trimethyl Siloxy PEG-Butyraldehyde 5000 Synthesis

A 100 g of trimethyl siloxy PEG 5000 and 14 g of sodium hydride (NaH) were dissolved in 1,000 ml of 1,4-dioxane, followed by stirring at a reflux temperature of 1,4-dioxane for 3 hours. A 18 g of 3-(2,2-dimethyl-1,3-dioxolan-4-yl) propyl methanesulfonate, as mesylated acetonide, was added to the resultant mixture, followed by additionally stirring at the reflux temperature of 1,4-dioxane for 16 to 18 hours. Next, the resultant mixture was dried by evaporating a solvent therein, and a residue was dissolved in deionized water. When layer separation occurred, an aqueous layer was extracted with methylene chloride twice, and an organic layer was collected. The collected organic layer was dried with magnesium sulfate and concentrated, followed by solidification with diethylether. A precipitated product was filtered and vacuum-dried at room temperature for 24 hours. As a result, trimethyl siloxy PEG-acetonide 5000 was obtained.

The trimethyl siloxy PEG-acetonide 5000 was dissolved in 1,000 ml of a 1 N hydrochloric acid solution, followed by stirring at room temperature 15 to 20 hours. Next, an aqueous sodium hydrogen carbonate solution was added to the resultant mixture to neutralize the mixture, followed by extraction with methylene chloride twice. A collected organic layer was dried with magnesium sulfate and then concentrated, followed by solidification with diethylether. A precipitated product was filtered and vacuum-dried at room temperature for 24 hours. As a result, trimethyl siloxy PEG-1,2-pentanediol 5000 was obtained.

The trimethyl siloxy PEG-1,2-pentanediol 5,000 was dissolved in 1,000 ml of deionized water, and 5 g of sodium periodate (NaIO$_4$) was added thereto, followed by stirring at room temperature for 1 hour. Deionized water was added to the resultant mixture. Methylene chloride was added to an aqueous layer, followed by mixing such that layer separation occurred. Deionized water was added to an organic layer, followed by mixing such that layer separation occurred. The organic layer was collected. The collected organic layer was dried with magnesium sulfate and concentrated, followed by solidifying with diethylether. A precipitated product was filtered and vacuum-dried at room temperature for 24 hours. As a result, trimethyl siloxy PEG-butyraldehyde 5000 (Compound 5) was obtained.

Example 6: Trimethyl Siloxy PEG-Propionaldehyde 5000 Synthesis

A 100 g of trimethyl siloxy PEG 5000 and 14 g of sodium hydride (NaH) were dissolved in 1,000 ml of 1,4-dioxane, followed by stirring at a reflux temperature of 1,4-dioxane for 3 hours. A 18 g of 2-(2,2-dimethyl-1,3-dioxolan-4-yl) propyl methanesulfonate, as mesylated acetonide, was added to the resultant mixture, followed by additionally stirring at the reflux temperature of 1,4-dioxane for 16 to 18 hours. Next, the resultant mixture was dried by evaporating a solvent therein, and a residue was dissolved in deionized water. When layer separation occurred, an aqueous layer was extracted with methylene chloride twice, and an organic layer was collected. The collected organic layer was dried with magnesium sulfate and concentrated, followed by solidification with diethylether. A precipitated product was filtered and vacuum-dried at room temperature for 24 hours. As a result, trimethyl siloxy PEG-acetonide 5000 was obtained.

The trimethyl siloxy PEG-acetonide 5000 was dissolved in 1,000 ml of a 1 N hydrochloric acid solution, followed by stirring at room temperature 15 to 20 hours. Next, an aqueous sodium hydrogen carbonate solution was added to the resultant mixture to neutralize the mixture to pH 7, followed by extraction with methylene chloride twice. A collected organic layer was dried with magnesium sulfate and then concentrated, followed by solidification with diethylether. A precipitated product was filtered and vacuum-dried at room temperature for 24 hours. As a result, trimethyl siloxy PEG-1,2-butanediol 5000 was obtained.

The trimethyl siloxy PEG-1,2-butanediol 5000 was dissolved in 1,000 ml of deionized water, and 5 g of sodium periodate was added thereto, followed by stirring at room temperature for 1 hour. Deionized water was added to the resultant mixture. Methylene chloride was added to an aqueous layer, followed by mixing such that layer separation occurred. Deionized water was added to an organic layer, followed by mixing such that layer separation occurred. The organic layer was collected. The collected organic layer was dried with magnesium sulfate and concentrated, followed by solidifying with diethylether. A precipitated product was filtered and vacuum-dried at room temperature for 24 hours. As a result, trimethyl siloxy PEG-propionaldehyde 5000 (Compound 6) was obtained.

Example 7: Trimethyl Siloxy PEG-Benzotriazolyl Carbonate 5000 Synthesis

A 100 g of trimethyl siloxy PEG 5000 was dissolved in 600 ml of acetonitrile, and then 65 ml of pyridine was added thereto, followed by stirring at room temperature for 30 minutes. 60 g of di(1-benzotriazolyl)carbonate was added to the resultant mixture, followed by stirring at room temperature for 3 hours. Next, the resultant mixture was filtrated with a pyridine salt, and the reaction solvent was dried through evaporation. A crude product was dissolved in deionized water, and then extracted with methylene chloride twice, thereby an organic layer was collected. The collected organic layer was dried with magnesium sulfate and concentrated, followed by solidification with diethylether. A precipitated product was filtered and dissolved in ethyl acetate for re-crystallization, followed by vacuum-drying at room temperature for 24 hours. As a result, trimethyl siloxy PEG-benzotriazolyl carbonate 5000 (Compound 7) was obtained.

Example 8: Trimethyl Siloxy PEG-Nitrophenyl Carbonate 5000 Synthesis

A 100 g of trimethyl siloxy PEG 5000 was dissolved in 500 ml of methylene chloride. Next, 7 ml of trimethylamine was added to the resultant mixture, and 8 g of p-nitrophenyl chloroformate was added thereto at 0 to 5° C. The resultant mixture was stirred at room temperature for 20 to 24 hours, and then extracted with methylene chloride to collect an organic layer. The collected organic layer was dried with magnesium sulfate and concentrated, followed by solidification with diethylether. A precipitated product was filtered, and vacuum-dried at room temperature for 24 hours. As a result, trimethyl siloxy PEG-nitrophenyl carbonate 5000 (Compound 8) was obtained.

Example 9: Trimethyl Siloxy PEG-Succinimidyl Carbonate 5000 Synthesis

A 100 g of trimethyl siloxy PEG 5000 was dissolved in 500 ml of 1,4-dioxane, and 100 g of disuccinimidyl carbonate (DSC) and 14.6 g of dimethyl aminopyridine (DMAP) were added thereto. The resultant mixture was stirred at 30 to 40° C. for 20 to 24 hours, and then dried by evaporating a solvent therein. A residue was dissolved in ethyl acetate and re-crystallized. A resultant product was collected through filtration and washed with diethylether. Next, a resultant product was vacuum-dried at room temperature for 24 hours. As a result, trimethyl siloxy PEG-succinimidyl carbonate 5000 (Compound 9) was obtained.

Example 10: Trimethyl Siloxy PEG-Succinimidyl Carboxymethyl 5000 Synthesis

A 100 g of trimethyl siloxy PEG 5000 and 22 g of potassium tert-butoxide (t-BuOK) were dissolved in 1,000 ml of tert-butanol, followed by stirring at 70° C. for 3 hours. A 33 g of ethylbromoacetate was added to the mixture, followed by stirring for 16 to 18 hours. The mixture was dried by evaporation, and the residue was collected and dissolved in methylene chloride. The mixture was washed with deionized water to induce a layer separation, and the organic layer was collected. The collected organic layer was dried with magnesium sulfate and concentrated, followed by solidification with diethylether. The precipitated product was filtered and vacuum-dried at room temperature for 24 hours. As a result, trimethyl siloxy PEG-ethylacetate 5000 was obtained.

The trimethyl siloxy PEG-ethylacetate 5000 was dissolved in 1,000 ml of a 1 N NaOH solution, followed by stirring at room temperature 15 to 20 hours. An aqueous 6 N HCl solution was added to the mixture to pH 2, followed by extraction with methylene chloride twice. The collected organic layer was dried with magnesium sulfate and then concentrated, followed by solidification with diethylether. The precipitated product was filtered and vacuum-dried at room temperature for 24 hours. As a result, trimethyl siloxy PEG-acetic acid 5000 was obtained.

The trimethyl siloxy PEG-acetic acid 5000 was dissolved in 300 ml of methylene chloride, and 4.6 g of n-hydroxyl succinimide (NHS) and 8 g of dicyclohexyl carbodiimide (DCC) were added thereto. The mixture was stirred at room temperature for 15 to 20 hours, and then filtered. The solvent in the resultant filtrate was concentrated, and then the filtrate was solidified with diethylether. The precipitated product was dissolved in ethyl acetate and re-crystallized. The resultant product was collected through filtration and washed with diethylether, followed by vacuum-drying at room temperature for 24 hours. As a result, trimethyl siloxy PEG-succinimidyl carboxymethyl 5000 (Compound 10) was obtained.

Example 11: Trimethyl Siloxy PEG-Succinimidyl Glutarate 5000 Synthesis

A 100 g of trimethyl siloxy PEG 5000 was dissolved in 500 ml of methylene chloride, and then 17 ml of trimethylamine was added thereto, and then 11 ml of glutaric anhydride was added thereto at room temperature. The resultant mixture was stirred at room temperature for 20 to 24 hours and washed with deionized water. When layer separation occurred, an organic layer was collected, and an aqueous layer was extracted with methylene chloride. The collected organic layer was dried with magnesium sulfate and concentrated, followed by solidification with diethylether. A precipitated product was filtered, and vacuum-dried at room temperature for 24 hours. As a result, trimethyl siloxy PEG-glutaric acid 5000 was obtained.

The trimethyl siloxy PEG-glutaric acid 5000 was dissolved in 300 ml of methylene chloride, and 5 g of n-hydroxyl succinimide (NHS) and 8 g of dicyclohexyl carbodiimide (DCC) were added thereto. The resultant mixture was stirred at room temperature for 15 to 20 hours, and then filtered. A solvent in the resultant filtrate was concentrated, and then the filtrate was solidified with diethylether. A precipitated product was dissolved in ethyl acetate and re-crystallized. Next, a resultant product was collected through filtration and washed with diethylether, followed by vacuum-drying at room temperature for 24 hours. As a result, trimethyl siloxy PEG-succinimidyl glutarate 5000 (Compound 11) was obtained.

Example 12: Trimethyl Siloxy PEG-Succinimidyl Propionate 5000 Synthesis

A 100 g of trimethyl siloxy PEG 5000 was dissolved in 500 ml of deionized water, and 3 g of potassium hydroxide (KOH) was added thereto at room temperature. A 19 ml of acrylonitrile was added to the resultant mixture dropwise at room temperature for 3 hours, followed by stirring at room temperature for 2 days. Next, sodium phosphate was added to the resultant mixture to neutralize to pH 7. A product was extracted twice with methylene chloride. An organic layer was dried with magnesium sulfate and concentrated, followed by solidification with diethylether. A solidified product was filtered and vacuum-dried at room temperature for 24 hours. As a result, trimethyl siloxy PEG-propionitrile 5000 was obtained.

The trimethyl siloxy PEG-propionitrile 5000 was dissolved in 300 ml of a concentrated hydrochloric acid solution, followed by stirring at room temperature for 6 days. Next, the resultant solution was diluted with deionized water and was subjected to extraction twice with methylene chloride. An organic layer was dried with magnesium sulfate and concentrated, followed by solidification with diethylether. A solidified product was filtered and vacuum-dried at room temperature for 24 hours. As a result, trimethyl siloxy PEG-propionamide 5000 was obtained.

The trimethyl siloxy PEG-propionamide 5000 was dissolved in 400 ml of an aqueous 10% potassium hydroxide solution, followed by stirring at room temperature for 20 to 24 hours. Next, concentrated hydrochloric acid was added to the resultant mixture to adjust the pH thereof to 2, followed by extracting twice with methylene chloride. Next, an organic layer was dried with magnesium sulfate and concentrated, followed by solidification with diethylether. A precipitated product was filtered and vacuum-dried at room temperature for 24 hours. As a result, trimethyl siloxy PEG-propionic acid 5000 was obtained.

The trimethyl siloxy PEG-propionic acid 5000 was dissolved in 300 ml of methylene chloride, and then 5 g of n-hydroxyl succinimide (NHS) and 9 g of dicyclohexyl carbodiimide (DCC) were added thereto, followed by stirring at room temperature for 15 to 20 hours. Next, the resultant mixture was filtered. A solvent in the resultant filtrate was concentrated, and then the filtrate was solidified with diethylether. A solidified product was filtered, and then dissolved in ethyl acetate to be re-crystallized. The re-crystallized product was filtered, and then washed with diethylether, followed by vacuum-drying at room temperature for 24 hours. As a result, trimethyl siloxy PEG-succinimidyl propionate 5000 (Compound 12) was obtained.

Example 13: Trimethyl Siloxy PEG-Succinimidyl Succinate 5000 Synthesis

A 100 g of trimethyl siloxy PEG 5,000 was dissolved in 500 ml of methylene chloride, and then 17 ml of trimethylamine was added thereto and 10 g of succinic anhydride was added thereto at room temperature. Next, the resultant mixture was stirred at room temperature for 20 to 24 hours, and then was washed with deionized water. When layer separation occurred, an aqueous layer was extracted with methylene chloride, and an organic layer was collected, dried with magnesium sulfate, and concentrated, followed by solidification with diethylether. A precipitated product was filtered, and vacuum-dried at room temperature for 24 hours. As a result, trimethyl siloxy PEG-succinic acid 5000 was obtained.

The trimethyl siloxy PEG-succinic acid 5000 was dissolved in 300 ml of methylene chloride, and 5 g of n-hydroxyl succinimide (NHS) and 8 g of dicyclohexyl carbodiimide (DCC) were added thereto. A resultant mixture was stirred at room temperature for 15 to 20 hours, and then filtered. A solvent in a resultant filtrate was concentrated, and then the filtrate was solidified with diethylether. A solidified product was filtered, and then dissolved in ethyl acetate to be re-crystallized. The crystallized product was filtered and washed with diethylether. Next, a resultant product was vacuum-dried at room temperature for 24 hours. As a result, trimethyl siloxy PEG-succinimidyl succinate 5000 (Compound 13) was obtained.

Example 14: Trimethyl Siloxy PEG-Epoxide 5000 Synthesis

A 100 g of trimethyl siloxy PEG 5000 was melted at 60° C., and 5 g of sodium hydroxide (NaOH) and 1 ml of deionized water were added thereto. A 24 ml of epichlorohydrin and 0.1 g of 2,6-di-tert-butyl-4-methylphenol (BHT) were added to the resultant mixture, followed by stirring at 60 to 65° C. for 15 to 20 hours. Next, the resultant mixture was cooled until room temperature and dissolved in deionized water. The resultant mixture was extracted twice with methylene chloride, and an organic layer was separated therefrom, dried with magnesium sulfate, and concentrated, followed by solidification with diethylether. A precipitated product was filtered, and vacuum-dried at room temperature for 24 hours. As a result, trimethyl siloxy PEG-epoxide 5000 (Compound 14) was obtained.

Example 15: Trimethyl Siloxy PEG-Amine 5000 Synthesis

A 100 g of trimethyl siloxy PEG 5000 was dissolved in 800 ml of methylene chloride, and then 17 ml of trimethylamine was added thereto. A 19 g of p-toluenesulfonyl chloride was added to the resultant mixture at room temperature. The resultant mixture was stirred at room temperature for 24 hours, and then deionized water was added thereto. When layer separation occurred, an aqueous layer was extracted with methylene chloride, and an organic layer was collected, dried with magnesium sulfate, and concentrated, followed by solidification with diethylether. A precipitated product was filtered, and vacuum-dried at room temperature for 24 hours. As a result, trimethyl siloxy PEG-tosylate 5000 was obtained.

The trimethyl siloxy PEG-tosylate 5000 was dissolved in methylene chloride, and then 2,500 ml of 28% ammonia water was added thereto in a closed system, followed by stirring at room temperature. A product was extracted with methylene chloride twice, and an organic layer was collected. The collected organic layer was dried with magnesium sulfate and concentrated, followed by solidification with diethylether. A precipitated product was filtered, and vacuum-dried at room temperature for 24 hours. As a result, trimethyl siloxy PEG-amine 5000 (Compound 15) was obtained.

Example 16: Trimethyl siloxy PEG-Maleimide 5000 Synthesis

A 100 g of trimethyl siloxy PEG-amine was dissolved in a mixed solvent of 400 ml of N,N-dimethyl-acetamide (DMAC) and 80 ml of 1-cychlohexyl-2-pyrrolidinone, and 20 g of maleic anhydride was added thereto, followed by stirring at 80 to 90° C. for 16 to 18 hours. Next, the resultant mixture was cooled, and diethylether was added thereto for precipitation. A precipitate was collected through filtration and washed with diethylether three times, followed by vacuum-drying at room temperature for 24 hours. As a result, trimethyl siloxy PEG-maleamic acid 5000 was obtained.

The trimethyl siloxy PEG-maleamic acid 5000 was dissolved in a mixed solvent of 300 ml of methylene chloride and 75 ml of N,N-dimethylformamide (DMF), and 9 ml of N,N-diisopropylethyl amine (DIEA) was added thereto, followed by stirring at 0° C. for 10 minutes. Next, 8 ml of pentafluorophenyl trifluoroacetate (PFP-TFA) was slowly added to the resultant mixture dropwise over 30 minutes, followed by stirring at 0° C. for 30 minutes. Next, the resultant mixture was refluxed at 50 to 60° C. for 20 to 24 hours and cooled until room temperature. A solvent in the resultant mixture was removed in a vacuum state, and diethylether was added thereto for precipitation. The resultant mixture was filtered to collect a precipitate. The collected precipitate was washed with diethylether three times, and then vacuum-dried at room temperature for 24 hours. As a result, trimethyl siloxy PEG-maleimide 5000 (Compound 16) was obtained.

Example 17: Trimethyl Siloxy PEG-Sulfhydryl 5000 Synthesis

A 100 g of trimethyl siloxy PEG 5000 was dissolved in 800 ml of deionized water, and then the resultant solution was degassed by bubbling nitrogen gas for 1 hour. A 100 g of thiourea was added thereto, followed by stirring at a reflux temperature for 15 to 20 hours. Next, a 800 ml of a 1 N sodium hydroxide (NaOH) solution was added to the resultant mixture, followed by stirring at a reflux temperature for 2 hours and the resultant mixture was cooled until room temperature. The resultant mixture was extracted with methylene chloride twice, and an organic layer thereof was dried with magnesium sulfate and concentrated, followed by solidification with diethylether. A precipitated product was filtered, and vacuum-dried at room temperature for 24 hours. As a result, trimethyl siloxy PEG-sulfhydryl 5000 (Compound 17) was obtained.

Example 18: Triethyl Siloxy PEG 5000 Synthesis 18-1. Triethyl Siloxy PEG 400 Synthesis Triethyl siloxy PEG 400 was synthesized according to Reaction Scheme 2-1 below:

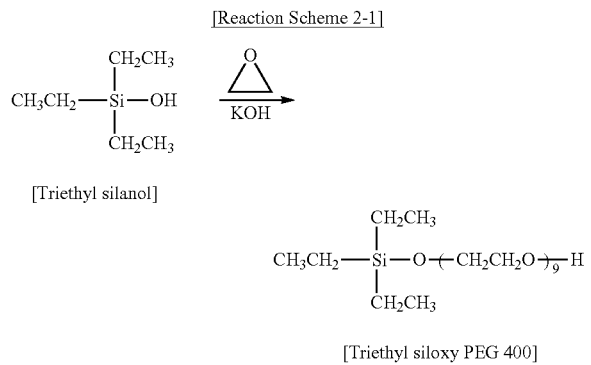

Triethyl silanol is used as the starting material in this example, however, other types of starting material such as triethyl silanoic potassium salt or triethyl silanoic sodium salt can also be used. Particularly, a 10 L reactor was washed with water and dried, and then filled with nitrogen gas. A 20 g of triethyl silanol and 0.4 g of potassium hydroxide (KOH), as a catalyst, were introduced into the reactor. A solution in the reactor was stirred, and an internal temperature of the reactor was elevated up to 80° C. while continuously supplying nitrogen gas thereto. After the internal temperature of the reactor reached 80° C., ethylene oxide (EO) gas was introduced into the reactor at a rate of 25 g/h until a final amount reached 200 g while controlling an internal pressure of the reactor. After introducing the EO gas, the internal temperature of the reactor was elevated up to 135° C., and 550 g of EO was added to the reactor. Next, an internal pressure of the reactor was maintained at 2 to 5 kg/cm² for 8 hours while maintaining the reactor temperature. Next, the temperature of the reactor was elevated to 145° C. and maintained for 1 hour, followed by cooling the reactor and removing unreacted EO. As a result, approximately 200 g of triethyl siloxy PEG with molecular weight of 400 Da was obtained.

18-2. Triethyl Siloxy PEG 2000 Synthesis

Triethyl siloxy PEG 2000 was synthesized according to Reaction Scheme 2-2 below:

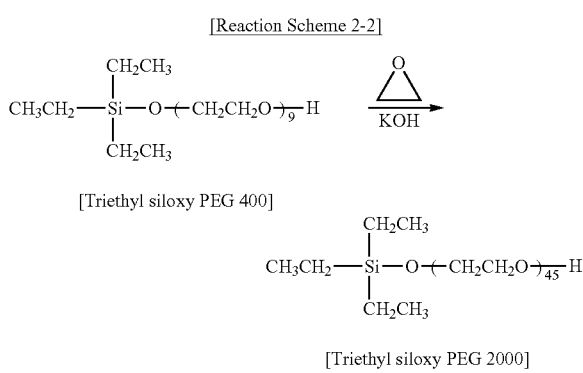

A 10 L reactor was washed with water and dried, and then filled with nitrogen gas. An internal temperature of the reactor was set to 80° C. A 200 g of the triethyl siloxy PEG 400 synthesized in Example 2-1 was introduced into the reactor. A solution in the reactor was stirred, and an internal temperature of the reactor was elevated up to 100° C. while continuously supplying nitrogen gas thereto. After the internal temperature of the reaction reached 100° C., EO gas was introduced into the reactor at a rate of 50 g/h until a final amount reached 700 g. After introducing the EO gas, the internal temperature of the reactor was elevated up to 125° C., and an internal pressure of the reactor was maintained at a pressure of 2 to 5 kg/cm² for 8 hours while maintaining the reactor temperature. Next, the temperature of the reactor was elevated to 135° C. and maintained for 1 hour, followed by cooling the reactor and removing unreacted EO by means of a vacuum pump. As a result, triethyl siloxy PEG with molecular weight of 2000 Da was obtained.

18-3. Triethyl Siloxy PEG 5000 Synthesis

Triethyl siloxy PEG 5000 was synthesized according to Reaction Scheme 2-3 below:

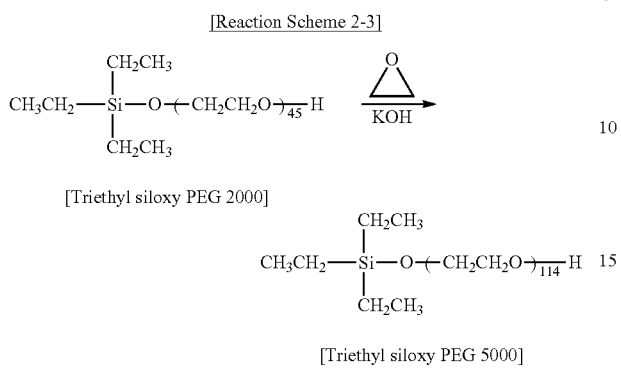

[Reaction Scheme 2-3]

[Triethyl siloxy PEG 2000]

[Triethyl siloxy PEG 5000]

A 10 L reactor was washed with water and dried, and then filled with nitrogen gas. An internal temperature of the reactor was set to 80° C. A 200 g of the triethyl siloxy PEG 2000 synthesized in Example 2-2 was introduced into the reactor. A solution in the reactor was stirred, and an internal temperature of the reactor was elevated up to 110° C. while continuously supplying nitrogen gas thereto. After the internal temperature of the reactor reached 110° C., EO gas was introduced into the reactor at a rate of 150 g/h until a final amount reached 1,200 g. After introducing the EO gas, the internal temperature of the reactor was elevated up to 125° C., and an internal pressure of the reactor was maintained at 2 to 5 kg/cm$^2$ for 8 hours while maintaining the reactor temperature. Next, the temperature of the reactor was elevated to 135° C. and maintained for 1 hour, followed by cooling the reactor until 90° C. and removing unreacted EO by means of a vacuum pump. A 1.6 g of acetic acid was added to the reactor, followed by stirring for 20 minutes. As a result, triethyl siloxy PEG 5000 (Compound 18) was obtained.

Example 19. Triethyl Siloxy PEG Derivatives Synthesis

Triethyl siloxy PEG derivatives, such as, triethyl siloxy PEG-acrylate 5000, triethyl siloxy PEG-methacrylate 5000, triethyl siloxy PEG-aldehyde 5000, triethyl siloxy PEG-butyraldehyde 5000, triethyl siloxy PEG-propionaldehyde 5000, triethyl siloxy PEG-benzotriazolyl carbonate 5000, triethyl siloxy PEG-nitrophenyl carbonate 5000, triethyl siloxy PEG-succinimidyl carbonate 5000, triethyl siloxy PEG-succinimidyl carboxymethyl 5000, triethyl siloxy PEG-succinimidyl glutarate 5000, triethyl siloxy PEG-succinimidyl propionate 5000, triethyl siloxy PEG-succinimidyl succinate 5000, triethyl siloxy PEG-epoxide 5000, triethyl siloxy PEG-amine 5000, triethyl siloxy PEG-maleimide 5000, triethyl siloxy PEG-sulfhydryl 5000, can be prepared by following the derivatization method as illustrated in Examples 2~17.

The trialkyl siloxy PEG compounds synthesized in Example 1 to 18 are summarized in Table 1 below.

TABLE 1

| Example | Compound | Name |
|---|---|---|
| 1 | CH$_3$—Si(CH$_3$)(CH$_3$)—O—(CH$_2$CH$_2$O)$_{114}$—H | Trimethyl siloxy PEG 5000 |
| 2 | CH$_3$—Si(CH$_3$)(CH$_3$)—O—(CH$_2$CH$_2$O)$_{114}$—C(O)—CH=CH$_2$ | Trimethyl siloxy PEG-acrylate 5000 |
| 3 | CH$_3$—Si(CH$_3$)(CH$_3$)—O—(CH$_2$CH$_2$O)$_{114}$—C(O)—C(CH$_3$)=CH$_2$ | Trimethyl siloxy PEG-methacrylate 5000 |
| 4 | CH$_3$—Si(CH$_3$)(CH$_3$)—O—(CH$_2$CH$_2$O)$_{114}$—CH$_2$—CHO | Trimethyl siloxy PEG-aldehyde 5000 |
| 5 | CH$_3$—Si(CH$_3$)(CH$_3$)—O—(CH$_2$CH$_2$O)$_{114}$—CH$_2$CH$_2$CH$_2$—CHO | Trimethyl siloxy PEG-butyraldehyde 5000 |

TABLE 1-continued

| Example | Compound | Name |
|---|---|---|
| 6 | 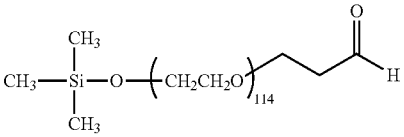 | Trimethyl siloxy PEG-propionaldehyde 5000 |
| 7 | 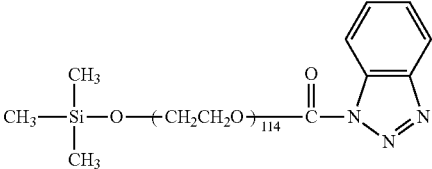 | Trimethyl siloxy PEG-benzotriazolyl carbonate 5000 |
| 8 | 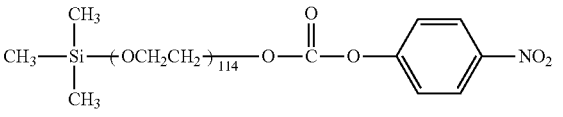 | Trimethyl siloxy PEG-nitrophenyl carbonate 5000 |
| 9 | 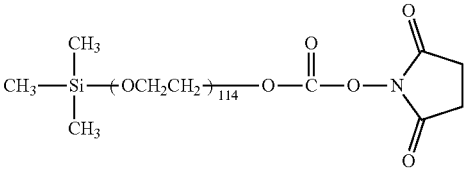 | Trimethyl siloxy PEG-succinimidyl carbonate 5000 |
| 10 | 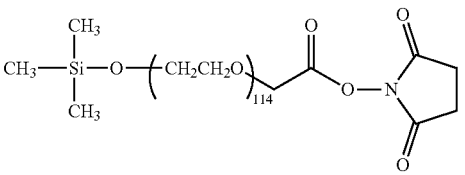 | Trimethyl siloxy PEG-succinimidyl carboxymethyl 5000 |
| 11 | 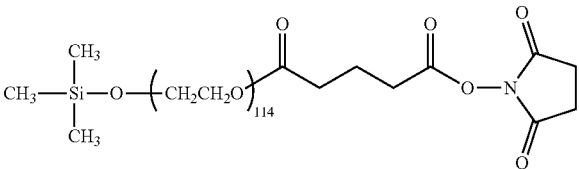 | Trimethyl siloxy PEG-succinimidyl glutarate 5000 |
| 12 | 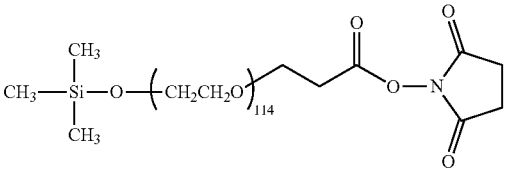 | Trimethyl siloxy PEG-succinimidyl propionate 5000 |
| 13 | 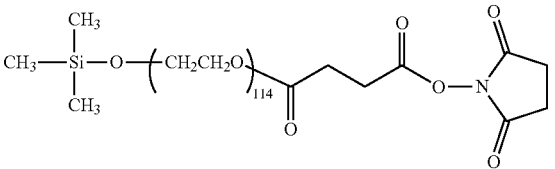 | Trimethyl siloxy PEG-succinimidyl succinate 5000 |
| 14 | 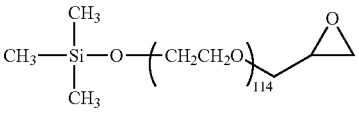 | Trimethyl siloxy PEG-epoxide 5000 |

TABLE 1-continued

| Example | Compound | Name |
|---|---|---|
| 15 | CH₃—Si(CH₃)(CH₃)—O—(CH₂CH₂O)₁₁₃—CH₂CH₂—NH₂ | Trimethyl siloxy PEG-amine 5000 |
| 16 | CH₃—Si(CH₃)(CH₃)—(OCH₂CH₂)₁₁₄—N-maleimide | Trimethyl siloxy PEG-maleimide 5000 |
| 17 | CH₃—Si(CH₃)(CH₃)—O—(CH₂CH₂O)₁₁₃—CH₂CH₂—SH | Trimethyl siloxy PEG-sulfhydryl 5000 |
| 18 | CH₃CH₂—Si(CH₂CH₃)(CH₂CH₃)—O—(CH₂CH₂O)₁₁₄—H | Triethyl siloxy PEG 5000 |

What is claimed is:

1. A trialkyl siloxy polyethylene glycol (PEG) represented by Formula 1 below and derivatives thereof:

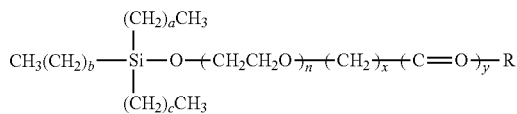

[Formula 1]

wherein a, b, and c are independently an integer of 0 to 10,
n is an integer of 2 to 10,000,
x is an integer of 0 to 5,
y is an integer of 0 or 1, and
R is selected from the group consisting of hydrogen, an amine group, a thiol group, a substituted or unsubstituted aryl group, a, and C2-C20 heterocyclic group.

2. The trialkyl siloxy polyethylene glycol according to claim 1, wherein, in the Formula 1,
a, b, and c are independently an integer of 0 to 10,
n is an integer of 2 to 10,000,
x is an integer of 0 to 5,
y is an integer of 0 or 1, and
R is selected from the group consisting of the hydrogen, the amine group, the thiol group, the substituted or unsubstituted aryl group, a C2-C10 heteroaryl group, the C2-C10 heterocyclic group, and a C2-C10 cyclic imide group.

3. The trialkyl siloxy polyethylene glycol according to claim 1, wherein, when x is 0 in the Formula 1,
a, b, and c are independently an integer of 0 to 10,
n is an integer of 2 to 10,000,
y is an integer of 0 or 1, and
R is selected from the group consisting of the hydrogen, a C2-C10 heteroaryl group, a C2-C10 cyclic imide group, the substituted or unsubstituted aryl group, and a C2-C10 alkyl-(C=O)-succinimidyl group.

4. The trialkyl siloxy polyethylene glycol according to claim 3, wherein the compound represented by the Formula 1 is selected from the group consisting of:
trialkyl siloxy PEG;
trialkyl siloxy PEG-benzotriazolyl carbonate;
trialkyl siloxy PEG-nitrophenyl carbonate;
trialkyl siloxy PEG-succinimidyl carbonate;
trialkyl siloxy PEG-maleimide;
trialkyl siloxy PEG-succinimidyl glutarate; and
trialkyl siloxy PEG-succinimidyl succinate.

5. The trialkyl siloxy polyethylene glycol according to claim 1, wherein, when x is 1 in the Formula 1,
a, b, and c are independently an integer of 0 to 10,
n is an integer of 2 to 10,000,
y is an integer of 0 or 1, and
R is the C2-C10 heterocyclic group or the hydrogen.

6. The trialkyl siloxy polyethylene glycol according to claim 5, wherein the compound represented by the Formula 1 is trialkyl siloxy PEG-aldehyde, trialkyl siloxy PEG-succinimidyl carboxymethyl ester, or trialkyl siloxy PEG-epoxide.

7. The trialkyl siloxy polyethylene glycol according to claim 1, wherein, when x is 2 in the Formula 1,
a, b, and c are independently an integer of 0 to 10,
n is an integer of 2 to 10,000,
y is an integer of 0 or 1, and
R is the amine group, a C2-C10 cyclic imide group, the thiol group, or the hydrogen.

8. The trialkyl siloxy polyethylene glycol according to claim 7, wherein the compound represented by the Formula 1 is selected from the group consisting of:
trialkyl siloxy PEG-amine;
trialkyl siloxy PEG-sulfhydryl;
trialkyl siloxy PEG-propionaldehyde; and
trialkyl siloxy PEG-succinimidyl propionate.

9. The trialkyl siloxy polyethylene glycol according to claim 1, wherein, when x is 3 in the Formula 1, a, b, and c are independently an integer of 0 to 10, n is an integer of 2 to 10,000, y is 1, and R is the hydrogen.

10. The trialkyl siloxy polyethylene glycol according to claim 9, wherein the compound represented by the Formula 1 is trialkyl siloxy PEG-butyraldehyde.

* * * * *